US008167163B2

(12) United States Patent
Chen

(10) Patent No.: US 8,167,163 B2
(45) Date of Patent: May 1, 2012

(54) COOKING POT HAVING A LID SUPPORTED ON THE POT IN AN UPRIGHT POSITION

(76) Inventor: Xiaosheng Chen, Guangzhou (CN)

( * ) Notice: Subject to any disclaimer, the term of this patent is extended or adjusted under 35 U.S.C. 154(b) by 455 days.

(21) Appl. No.: 11/837,045

(22) Filed: Aug. 10, 2007

(65) Prior Publication Data

US 2008/0302806 A1    Dec. 11, 2008

(30) Foreign Application Priority Data

Jun. 8, 2007    (CN) ...................... 2007 2 0052532 U

(51) Int. Cl.
A47J 36/12    (2006.01)
(52) U.S. Cl. .................. 220/379; 220/212.5; 220/573.1; 220/756; 220/763; 220/772
(58) Field of Classification Search .................. 220/212, 220/212.5, 379, 573.1–573.5, 744, 756, 761–764, 220/772, 846; A47J 36/12
See application file for complete search history.

(56) References Cited

U.S. PATENT DOCUMENTS

| 314,244 | A | * | 3/1885 | Henkel | 220/832 |
|---|---|---|---|---|---|
| 471,565 | A | * | 3/1892 | Nourse et al. | 220/379 |
| 498,020 | A | * | 5/1893 | Murray | 220/379 |
| 851,969 | A | * | 4/1907 | Vernon | 220/285 |
| 1,275,611 | A | * | 8/1918 | Schwab | 220/379 |
| 1,390,766 | A | * | 9/1921 | Cunningham | 220/744 |
| 1,745,548 | A | * | 2/1930 | Lerner | 248/229.26 |
| 1,928,995 | A | * | 10/1933 | De Biasi | 220/735 |
| 2,138,706 | A | * | 11/1938 | Myers | 219/398 |
| 2,258,145 | A | * | 10/1941 | Woodman | 220/379 |
| 2,259,770 | A | * | 10/1941 | Nove | 220/379 |
| 2,808,175 | A | * | 10/1957 | Aiken | 220/379 |
| 3,015,405 | A | * | 1/1962 | Sterling | 217/56 |
| 3,081,394 | A | * | 3/1963 | Arel et al. | 219/438 |
| 3,081,395 | A | * | 3/1963 | Wickenberg | 219/441 |

(Continued)

FOREIGN PATENT DOCUMENTS

| DE | 19923305 | A1 | * | 11/2000 |
|---|---|---|---|---|
| DE | 10006007 | A1 | * | 8/2001 |
| DE | 10247961 | A1 | * | 10/2003 |
| DE | 202005001914 | U1 | * | 5/2005 |
| JP | 06225834 | A | * | 8/1994 |
| JP | 09037950 | A | * | 2/1997 |
| JP | 09252934 | A | * | 9/1997 |
| JP | 10295547 | A | * | 11/1998 |
| JP | 2004089634 | A | * | 3/2004 |
| JP | 2007325752 | A | * | 12/2007 |

Primary Examiner — J. Gregory Pickett
Assistant Examiner — Ned A Walker

(57) ABSTRACT

A pot comprises a pot body having at least one handle and a pot lid having a lifting handle for covering the pot body. The pot lid is connected with the lifting handle by the lower end of a fixed portion of the lifting handle. The lifting handle is provided with a handle portion extending towards the outer edge of the pot lid from the upper end of the fixed portion. The handle of the pot body is provided with a pilot recess adapted to receive the tail of the handle portion. The tail of the handle portion is inserted into the pilot recess or lean against the outer edge of the pot body at the internal side, while the top surface of the pot lid leans against the upper portion of the inner wall of the pot body at two points, so as to ensure the pot lid to be laterally and stably retained on the pot body when the pot lid is laterally placed on the pot body. The pot according to the present invention within the configuration described above does eliminate the inconvenience, when the food in the pot is cooked without the lid, the pot lid has to be rested on a counter top, which not only takes up room, but could cause residue to drip onto the countertop.

2 Claims, 4 Drawing Sheets

U.S. PATENT DOCUMENTS

| | | | | |
|---|---|---|---|---|
| 3,850,331 A | * | 11/1974 | Oxel | 220/832 |
| 4,005,798 A | * | 2/1977 | Minsky | 220/379 |
| 4,279,357 A | * | 7/1981 | Robinson | 220/318 |
| 4,523,574 A | * | 6/1985 | Schlosser | 126/25 R |
| 4,592,483 A | * | 6/1986 | Scouten | 220/379 |
| 4,773,555 A | * | 9/1988 | Merino | 220/379 |
| 5,683,010 A | * | 11/1997 | Boyajian, Jr. | 220/744 |
| 6,006,943 A | * | 12/1999 | Laney | 220/379 |
| 6,105,810 A | * | 8/2000 | Daenen et al. | 220/366.1 |
| 6,234,067 B1 | * | 5/2001 | Schmidt | 99/426 |
| 6,571,975 B1 | * | 6/2003 | Fay | 220/379 |
| 7,485,831 B2 | * | 2/2009 | Tynes et al. | 219/433 |
| 2006/0174776 A1 | * | 8/2006 | Fissler | 99/403 |
| 2007/0210061 A1 | * | 9/2007 | Tynes et al. | 219/433 |

* cited by examiner

_US 8,167,163 B2_

COOKING POT HAVING A LID SUPPORTED ON THE POT IN AN UPRIGHT POSITION

BACKGROUND OF THE INVENTION

The present invention relates to cook ware, in particular to a pot with improved configuration enabling the lid to be secured with any condensate dripping back into the pot.

Generally, a conventional pot consists of a pot body and a pot lid to cover the pot body, a handle or two symmetrical handles provided on the outer wall of the pot body so as to allow the pot body to be carried conveniently, and similarly a cone-shaped lifting handle at the center of the outer surface of the pot lid. The configuration described above has two following defects: firstly, it is uncomfortable for the user to carry the pot lid by his fingers only, rather than the whole hand of the user; secondly, when the food in the pot has been boiled and the pot lid is removed, the pot lid often needs to be placed on a cabinet surface, which not only takes up room, but also incurs the problem of uncleanness due to the condensate on the pot lid dripping onto the table.

SUMMARY OF THE INVENTION

Having outlined the state of the prior art and its attendant shortages, it is, therefore, an object of the present invention to provide a pot with a lifting handle of a shape and configuration by which the pot lid when removed from the pot after cooking can be placed reliably on the pot body and allow any condensate on the pot lid to return into the pot body. It is another object of the present invention to provide a convenient and comfortable shaped handle for the user to carry the pot lid.

In order to achieve the objects set forth, the pot comprises a pot body having at least one handle and a pot lid having a lifting handle. The pot lid is connected with the lifting handle by the lower end of a fixed portion of the lifting handle. The lifting handle is provided with a handle portion extending towards the outer edge of the pot lid from the upper end of the fixed portion. The handle of the pot body is provided with a recess adapted to receive the tail of the handle portion.

The tail end portion of the handle portion is able to be inserted into the pilot recess, or can be leaned against the outer edge of the pot body at the internal side; while the top surface of the pot lid rests against the upper portion of the inner wall of the pot body at two points, so as to ensure the pot lid to be retained in a stable position on the pot body when the pot lid is laterally placed on the pot body.

The pot of the present invention allows the pot lid to be placed in an stable position on the pot body, so that the pot lid does not take up room on a cabinet top and any condensate on the pot lid returns into the pot body to avoid dirtying the counter top. Moreover, because the handle portion of the lifting handle extends towards the edge of the pot lid from the upper end of the fixed portion of the lifting handle, it is convenient and comfortable for the user to carry the pot lid by holding the handle portion of the lifting handle.

BRIEF DESCRIPTION OF THE DRAWINGS

The features of the present invention and its advantages as compared to the known state of the prior art will be better understood from the following description, relating to the attached drawings which show illustratively but not restrictively an example of a pot with improved configuration of the present invention.

In the drawings.

DETAILED DESCRIPTION OF THE PREFERRED EMBODIMENTS

Figure 1:
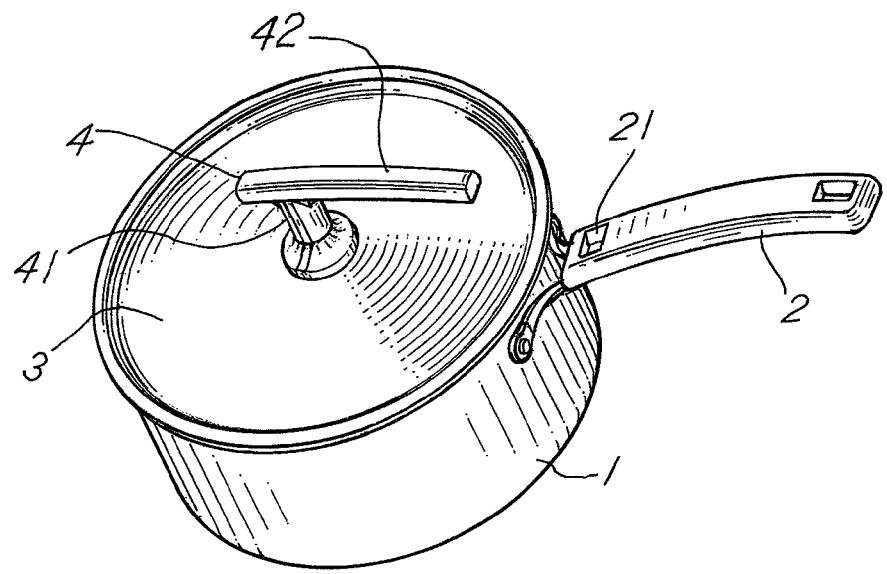
FIG. 1 is a perspective view of a pot according to an embodiment of the present invention.
Figure 2:
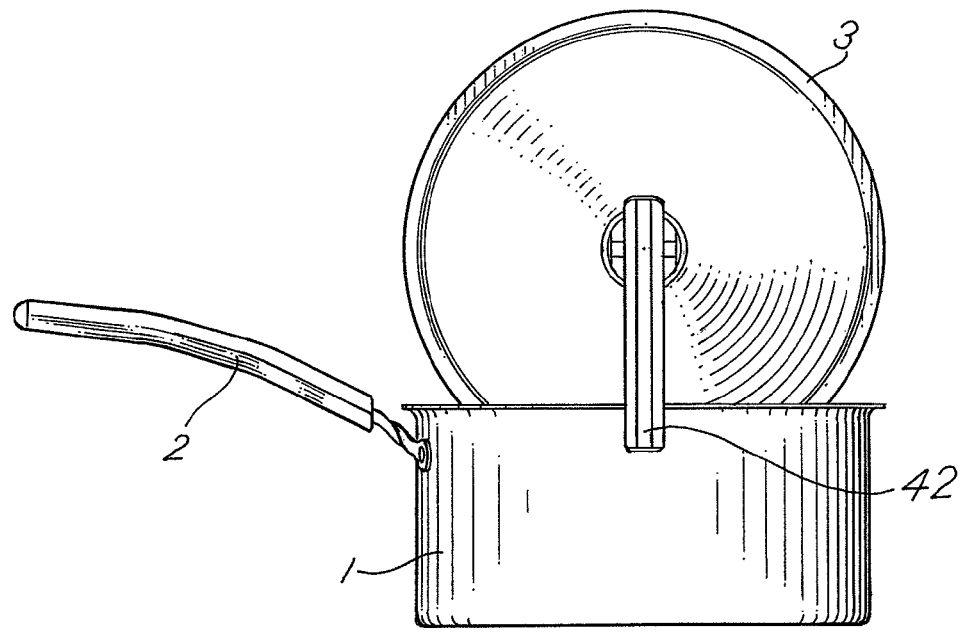
FIG. 2 is a front view of the pot as shown in FIG. 1 when the pot lid is placed upright on the pot body.
Figure 3:
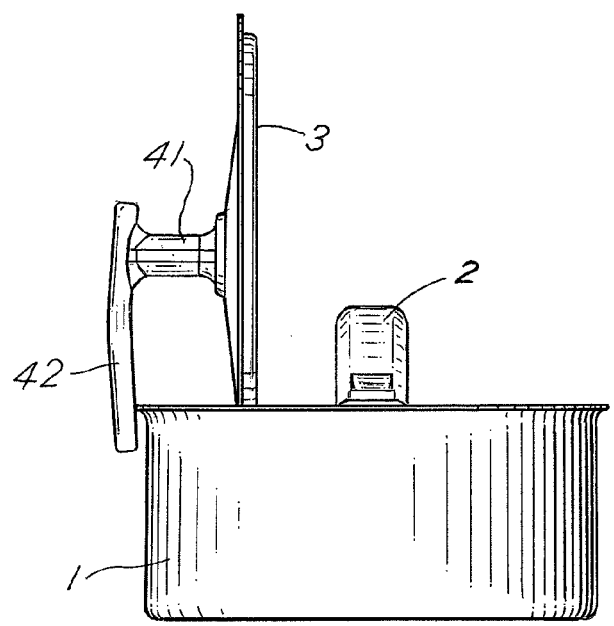
FIG. 3 is a side view of the pot as shown in FIG. 2.
Figure 4:
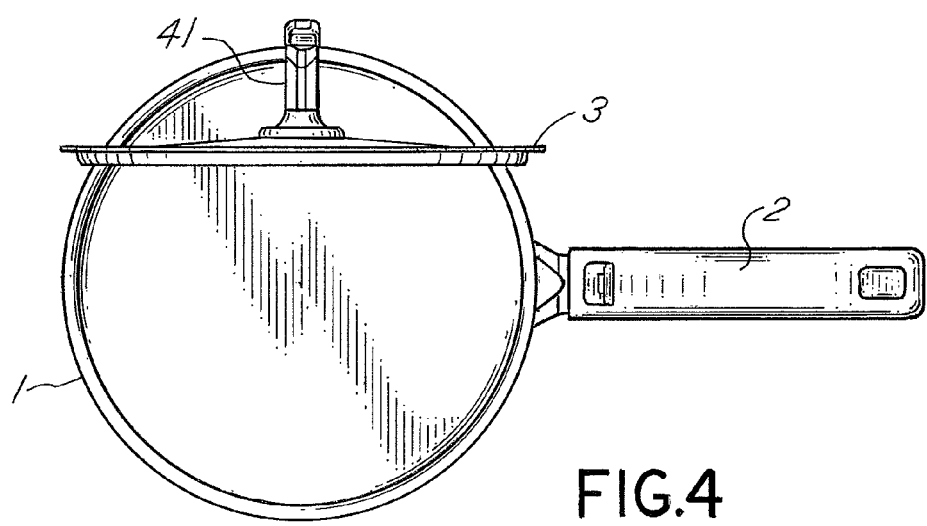
FIG. 4 is a top view of the pot as shown in FIG. 2.

Referring to FIGS. 1, 2, 3 and 4, a pot of the present invention comprises a pot body 1 and a pot lid 3. The pot body 1 is provided with a handle 2. The pot lid 3 is provided with a lifting handle 4 which is connected with the pot lid 3 by a fixed portion 41. The fixed portion 41 has a treaded hole for attachment with the pot lid 3 by a screw in the lower end. Generally, the lifting handle 4 is fixed at the center of the outer surface of the pot lid 3. The lifting handle 4 has a handle portion 42 extending towards the outer edge of the pot lid 3 from the upper end of the fixed portion 41. When the pot lid 3 is placed upright on the pot body 1, the top surface of the pot lid leans against the upper portion of the inner wall of the pot body 1 at two points, while the tail end portion of the handle portion 42 of the lifting handle is disposed to lean against the outer edge of the pot body 1 at the internal side, accordingly, the pot lid 3 is supported on at least three points such that the pot lid 3 is retained upright in a stable position on the pot body 1. With this configuration, the pot lid 3 does not take up room on the counter top and any condensate on the inside of the pot lid 3 will return to the pot body 1 to avoid dirtying the counter top. Moreover, it is convenient and comfortable for the user to carry the pot lid 3 by holding the handle portion 42 of the lifting handle 4.

Preferably, the handle portion 42 of the lifting handle is bar-shaped so as to be held more comfortably. Alternative, the handle portion 42 of the lifting handle 4 may be arc-shaped so as to be more attractive.

Figure 8:
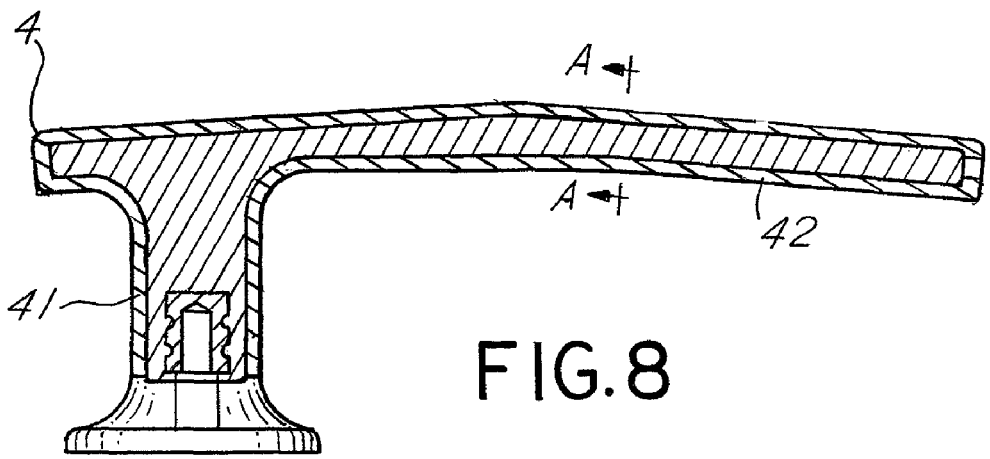
FIG. 8 is a sectional view of the lifting handle of the pot as shown in FIG. 7.
Figure 9:
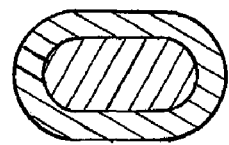
FIG. 9 is a detailed sectional view of the lifting handle taking along line A-A.

Preferably, as shown in FIG. 8 and FIG. 9, the handle portion 42 of the lifting handle 4 is of a wide and flattened cross section so as to ensure the internal side of the tail of the handle portion 42 lean against the outer edge of the pot body 1 with a contact surface, so that the pot lid 3 is placed on the pot body 1 more stably.

Figure 6:
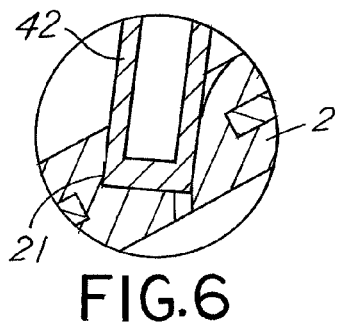
FIG. 6 is a detailed view of the portion "B" indicated in FIG. 5.
Figure 5:
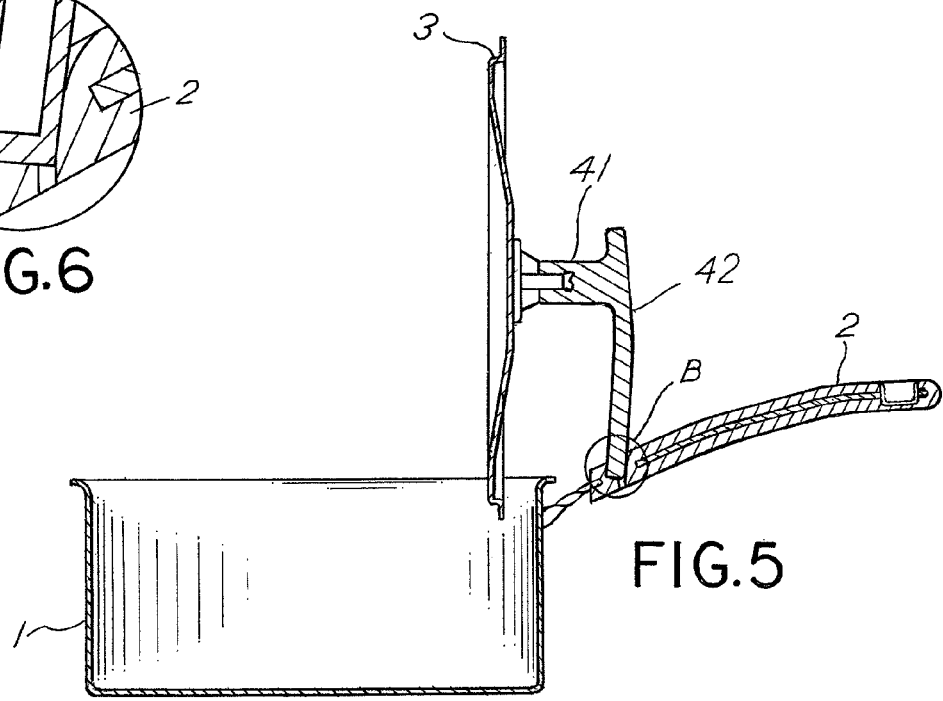
FIG. 5 is a view of the pot as shown in FIG. 2 when a tail portion of the lid handle is inserted into a recess in the pot handle.
Figure 7:
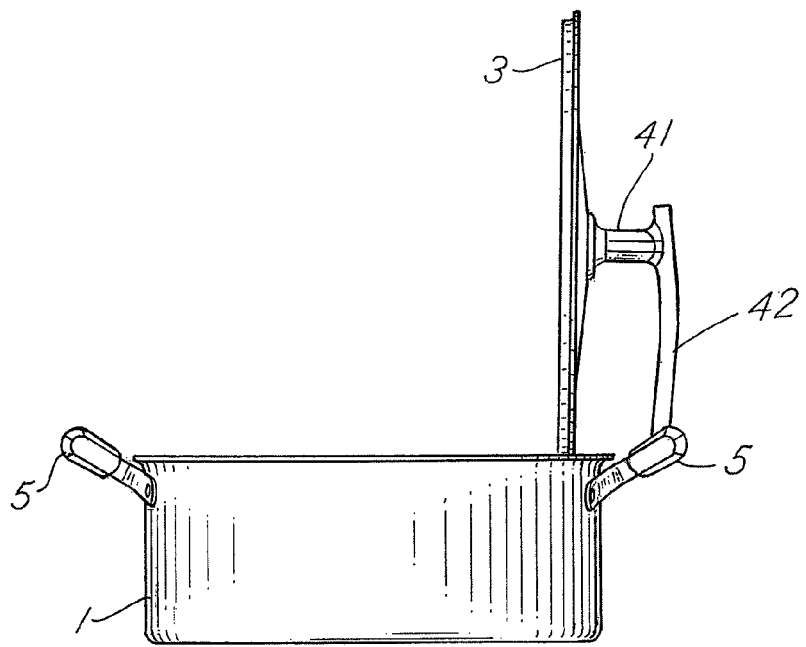
FIG. 7 is a view of a pot according to another embodiment of the present invention.

A pilot recess 21 for receiving the tail of the handle portion 42 of the lifting handle 4 is provided on the handle 2 of the pot body 1, as shown in FIG. 5; or on one or both handles 5 of the pot body 1, as shown in FIG. 7. When the pot lid 3 is placed upright on the pot body 1, the tail of handle portion 42 of the lifting handle 4 is adapted to be inserted into the pilot recess 21, while the top surface of the pot lid 3 leans against the upper portion of the inner wall of the pot body 1 at two symmetrical points. Generally, as shown in FIG. 6, the pilot recess 21 is not a through hole. With such a structure, the tail of handle portion 42 of the lifting handle 4 is adapted to be held within the pilot recess 21, the top surface of the pot lid 3 leans against the upper portion of the inner wall of the pot body 1 at two points, and accordingly the pot lid 3 is stably and laterally retained on the pot body 1.

Preferably, the pilot recess 21 is inclined outwards such that the pot lid 3 is inclined outwards when the tail of the handle portion 42 of the lifting handle 4 is inserted into the pilot recess 21 to allow the pot lid 3 to be placed upright on the pot body 1, so that larger space of the pot body 1 is exposed to the user for operating in the pot body 1 such as adding things into the pot body 1, blending the soup, etc.

As an embodiment of the present invention, the handle portion 42 of the lifting handle 4 and the fixed portion 41 may be two individual parts, where the handle portion 42 is connected to the upper end of the fixed portion 41 by means such as by screws. This separable structure is mainly for easier packing and to minimize the dimension of the packing box.

The dimension of each part of the lifting handle may be determined according to the diameter of the pot and other factors such that the pot lid 3 can be placed upright in a stable position on the pot body 1 and lager space of the pot body 1 is exposed to the user for operation, and that the pot lid 3 enters into the pot body 1 in short distance to ensure that the edge of the pot lid 3 does not touch the food in the pot body 1. The tail of the handle portion 42 of the lifting handle does not exceed the outer edge of the pot lid 3 when the lifting handle 4 is mounted onto the pot lid 3, so that the reverse side of the pot lid 3 with the lifting handle 4 can be placed inside the pot body 1 during packing; and accordingly the user can use the pot directly after buying same from the store.

Although the present invention has been described in connection with preferred embodiment thereof, many other variations and modifications will become apparent to those skilled in the art without departing from the scope of the invention. It is preferred, therefore, that the present invention shall not be limited by the specific disclosure herein, but only by the appended claims.

What is claimed is:

1. A pot comprising:
a pot body comprising:
- at least one outer handle having a recess with an upper opening and a lower base,
- an open interior, and
- an outer wall portion having an upper edge surrounding the open interior;

a pot lid for covering the open interior, the pot lid comprising:
- an inner surface portion,
- an outer edge, and
- an attached lifting handle, said lifting handle having a tail portion and a fixed portion with an upper end, the pot lid being connected to the fixed portion of the lifting handle, the lifting handle extending toward the outer edge of the pot lid from the upper end of the fixed portion;

a covered pot configuration wherein:
the outer edge portion of the pot lid is fitted substantially throughout to the upper edge of the pot body with the pot lid covering the open interior of the pot body;

an open pot configuration wherein:
the pot lid is removed from being fitted substantially throughout to the upper edge of the pot body and the tail portion of the lifting handle is received within the recess and is supported by the lower base of the recess, while the outer edge of the pot lid rests against the upper edge of the pot body at two points of contact, so as to ensure the pot lid is positioned laterally upright and stably retained on the pot body, and also by the recess receiving the tail portion, thereby providing three points of contact of the lid on the pot, and the pot lid being positioned inwardly so that any residue on the inner surface of the pot lid drains into the interior of the pot.

2. The pot of claim 1 wherein the recess is inclined outwards such that the pot lid in the open pot configuration is inside the upper edge of the pot body, while the tail portion of the lifting handle is inserted into the recess to allow the pot lid to be laterally upright on the pot body.

\* \* \* \* \*